Sept. 16, 1930.     H. A. BERN     1,775,807
THERMOSTATIC MIXING VALVE
Original Filed May 26, 1927     3 Sheets-Sheet 1
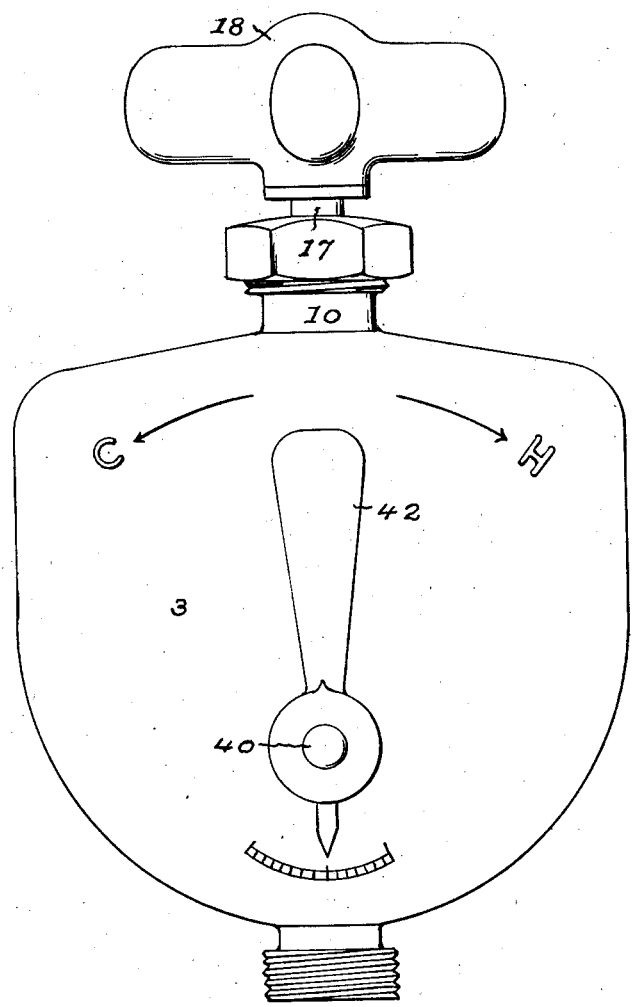
INVENTOR:
HARRY A. BERN,
by Robert Burns
ATTORNEY.

Sept. 16, 1930.  H. A. BERN  1,775,807
THERMOSTATIC MIXING VALVE
Original Filed May 26, 1927  3 Sheets-Sheet 2
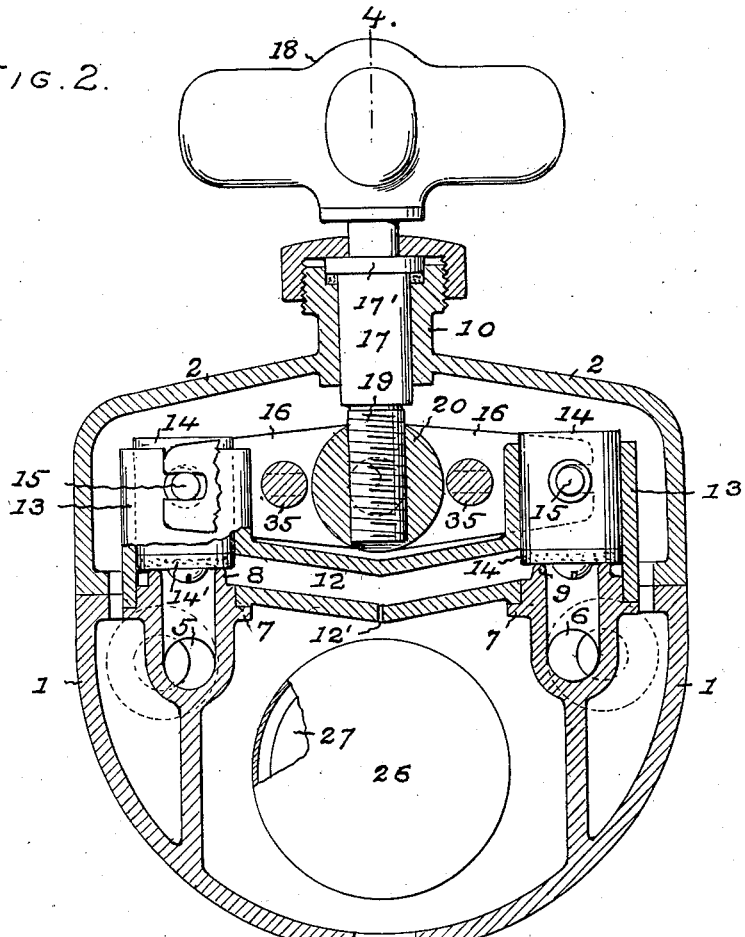
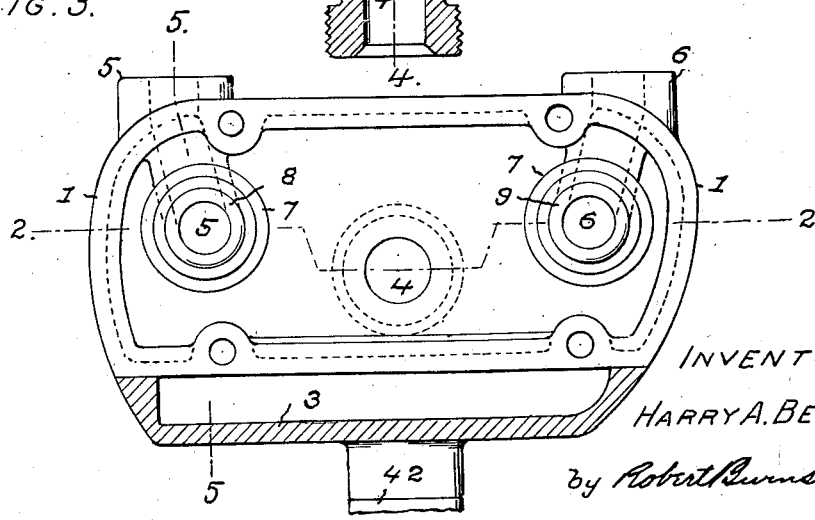

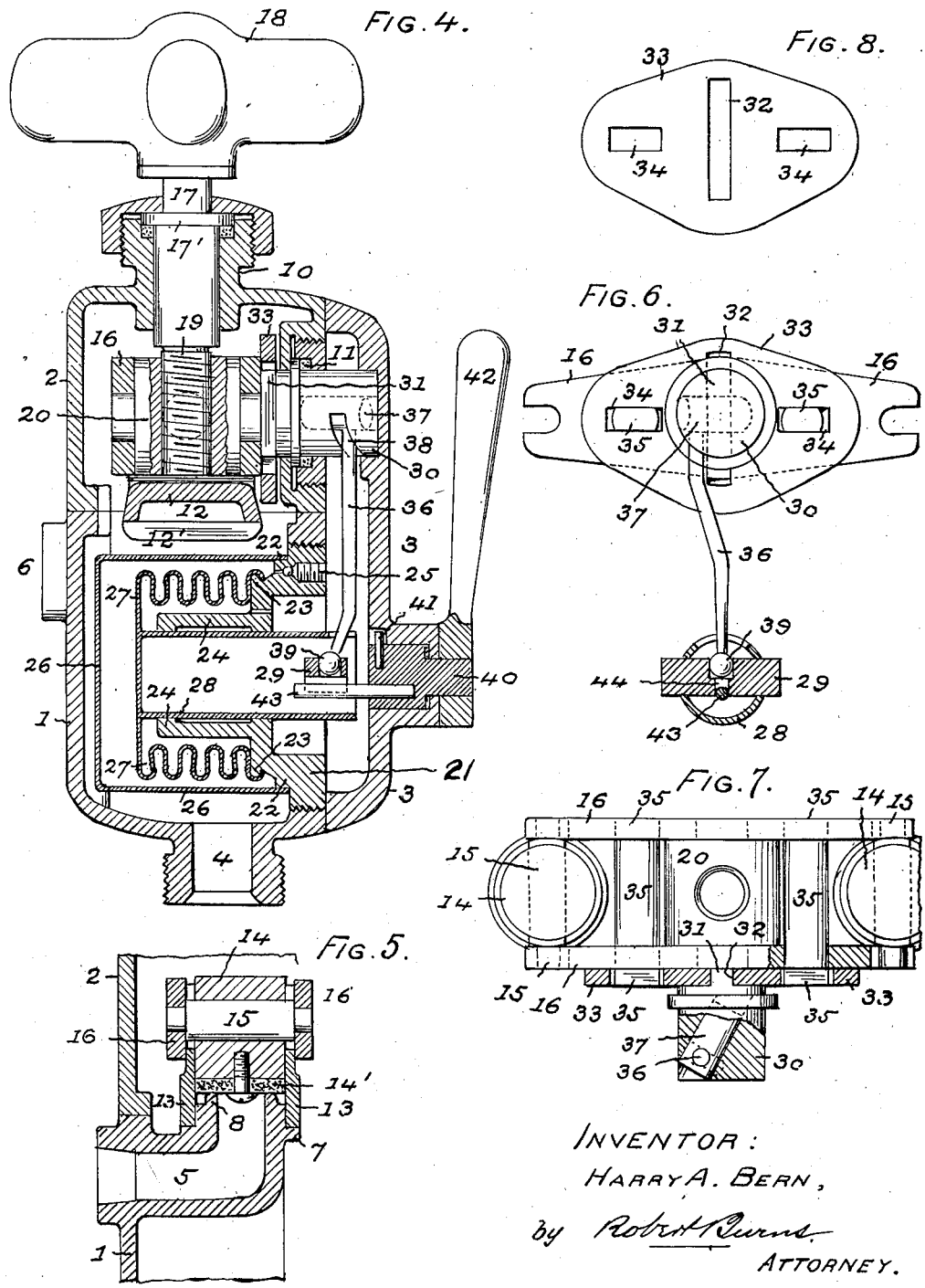

Patented Sept. 16, 1930

1,775,807

UNITED STATES PATENT OFFICE

HARRY A. BERN, OF CHICAGO, ILLINOIS

THERMOSTATIC MIXING VALVE

Application filed May 26, 1927, Serial No. 194,284. Renewed February 13, 1930.

This invention relates to that type of fluid mixing valves in which a flow of water of a predetermined temperature is attained through a thermostatic controlling means and in an automatic manner from separate supplies of hot and cold water entering the valve. An the present improvement has for its various objects:

To provide a structural formation and combination of parts of the intermediate mechanism between the thermostatic member and the movable valve members of the valves controlling the inlet passages of the hot and cold water supplies, by means of which automatic and complementary regulation of the outflow from the valve is attained in an accurate and effective manner.

To provide a structural arrangement of parts, in which the thermostatic member is arranged in the direct path of the outflow of water through the valve and wholly free from the disturbing influence of varying water pressure within the valve housing, to attain a sensitive and accurate operation of the thermostatic member and associated parts and mechanisms.

To provide in connection with above mentioned intermediate operating mechanism, a simple and effective means whereby a ready adjustment can be made to produce an outflow of water of the desired temperature, and without interference with or impedance of the normal operation of the controlling thermostatic member of the valve.

To provide a structural formation and combination of parts in the present valve structure, whereby the thermostatic controlling member is enclosed and protected from pressure of the fluid flowing through the valve, and by means of which said member is supported in proper relation to the parts and mechanism associated therewith, all as will hereinafter more fully appear.

In the accompanying drawings:—

Fig. 1, is a front elevation of a mixing valve having the manual adjusting means for regulating the outflow temperature, applied.

Fig. 2, is a sectional elevation on line 2—2, Fig. 3.

Fig. 3, is a plan view of the lower portion of the valve, the companion upper portion being removed.

Fig. 4, is a transverse sectional elevation on line 4—4, Fig. 2.

Fig. 5, is a detail vertical section on line 5—5, Fig. 3.

Fig. 6, is a detail front elevation of the intermediate mechanism between the thermostatic member and the movable valve members controlling the hot and cold water inlets.

Fig. 7, is a detail top view of the same.

Fig. 8, is an elevation of the loose or floating plate of the universal coupling of said mechanism.

Like reference numerals indicate like parts in the several views.

In the preferred construction shown in the drawings, the enclosing housing of the valve is of a three part sectional formation, having a detail construction as follows:—

The lower portion or section 1, of the housing has an open top shell form, provided at its lower end with a neck or duct 4 for the outflow of the attempered water. It is also provided with a pair of upright angular inlet necks 5 and 6, arranged in spaced relation, with the lower portions of the necks 5, 6, passing out through the rear wall of the portion or section 1, for connection with the respective hot and cold water supply pipes with which the valve is associated. In the present construction the wall of each of the vertical inner portions of each of said ducts or necks 5, 6, is of an annular shape adapted for internal engagement with a sleeve portion of the hereinafter described guiding and supporting member for the movable valve heads and their operating means hereinafter described. The construction being adapted to effect a proper relation between the parts, with an abutment collar 7 on each neck 5, 6, providing a partitioning means for the parts, and as shown in Figs. 2 and 5, the upper ends of the necks 5, 6, will extend upwards and form stationary valve seats 8 and 9.

In addition to the above features of construction, the lower portion of section 1 has its front wall formed with a screw threaded orifice, in which the thermostatic member of the present valve is supported in proper position in the structure.

The upper portion or section 2, of the housing has an open bottom shell form and fits upon and is attached to the lower portion or section 1 of the housing. The portion or section 2 is formed at its upper end with a centrally arranged journal neck 10 for the hereinafter described manually actuated screw shaft by which the starting and stopping of the valve is effected. In addition the front wall of said upper portion 2 is formed with a journal orifice for the hereinafter described semi-rotary operating head of the automatic valve operating means, and with said journal opening provided with a packing gland 11, to prevent leakage past said head.

The front and supplementary portion or section 3 of the valve housing, is of a shallow open back shell form and fits against and is secured to the front of the lower and upper portions 1, 2, of the housing. Near its upper end the portion or section 3 is formed with a bearing socket for the semi-rotary head of the intermediate operating mechanism above referred to, and in addition is formed with a journal orifice for the journal hub of the hereinafter described handle by which the mechanisms of the valve are adjusted to regulate the temperature of the outflowing water to suit a particular requirement.

The guiding head for the movable valve heads heretofore referred to, comprises a transversely extending tubular member 12, having at its respective ends counterpart cylindrical shells 13, 13, the lower ends of which have a close fit upon the upper ends of the walls of the inlet ducts 5 and 6 for the hot and cold water supplies, and with the passage or duct of said tubular member opening at its respective ends into the interior of the shells 13, at points above the aforesaid stationary valve seats 8 and 9, and in addition, is formed with a transverse slit or orifice 12' in its under side and at its midwidth as shown. In the present construction the aforesaid shells 13 constitute guides for a pair of valve heads 14, 14 associated with the aforesaid valve seats 8 and 9, with each valve head comprising a cylindrical block carrying a yielding seating disk 14', and in addition with cross pins 15 moving in vertical slots in the shells 13, and adapted for operative engagement with the respective ends of an operating rocking lever or bar 16, by which the valve heads are moved in unison. In the drawings the aforesaid guiding head, is shown as a separate member, and attached to the lower portion 1 of the housing, when so desired it may be formed as an integral part of said housing portion.

The above mentioned rocking lever or bar 16 constitutes a portion of the means by which the valve heads 14 are connected together to move in unison, and so that as one valve head moves towards its stationary seat, the companion valve head will move away from its seat, and vice versa. Said rocking lever in addition constitutes a portion of the means whereby both the valve heads are simultaneously moved to shut-off the supplies of hot and cold water as well as to simultaneously move said valve heads away from their seats to admit the supplies of water to the valve, with such last mentioned means involving a construction and arrangement of parts as follows:—

A vertically arranged stem 17 is journalled in the journal neck 10 of the upper portion or section 2 of the valve housing, and held from longitudinal movement by a collar 17'. At its upper and outer end said stem is provided with an operating knob or handle 18, and at its lower end with a screw threaded shank 19 adapted for operative engagement with a similarly formed orifice in a vertically adjustable cross head 20, on which the aforesaid rock bar or lever 16 is pivotally mounted, preferably by a detail construction of the parts as follows:—

Said rocking bar or lever 16 is formed by a pair of rails arranged in separated relation and formed with slots at their respective ends for operative engagement with the cross pin 15 of the movable valve heads 14 aforesaid, and with central journal orifices for turning engagement on journal studs formed on the respective ends of the aforesaid vertically adjustable cross head 20. In addition the rocking bar or lever 16 has connection through the hereinafter described universal coupling and intermediate mechanism with the controlling thermostatic member, to attain an automatic operation of the valve heads 14 to obtain and maintain a desired temperature of the water flowing from the valve.

The thermostatic controlling member above referred to, is arranged in the interior of the lower portion or section 1 of the valve housing, and in central relation with the outlet slit or orifice 12' of the tubular member 12 and in like central relation with the outlet neck or duct 4, aforesaid, so that in a downward passage of the attempered water will impinge the crown portion of said thermostatic member to spread and pass around the perimeter of the member before reaching the outlet neck or duct 4, and thus provide a very effective heat exchange in such passage. In the preferred construction shown, the thermostatic member or unit consists of a circular attaching head 21 screwing into the before described orifice in the front wall of the lower portion 1 of the valve housing, and formed with a pair of annular ledges 22, 23 in concentric relation, and with a centrally arranged guide hub 24 for purposes hereinafter stated. Intermediate of the aforesaid annular ledges 22, 23, the head 21 is provided with a filling orifice closed by a screw plug 25, as shown in Fig. 3.

The outer annular ledge 22 of the attaching head 21 provides an attaching means for an end of a closed casing or shell 26, which forms a part of the thermostatic controlling means of the present construction, and in which construction the casing or shell 26, houses and protects the hereinafter described thermo-expansion unit 27 from the influences of the varying water pressure in the outlet chamber of the valve structure.

The thermostatic member 27 above referred to, is of the longitudinally expansible shell or bellows type, and preferably comprising a cylindric shell formed with a series of corrugations in its perimeter, and having one end open so as to fit upon and be secured to the aforesaid inner annular ledge 23 of the attaching head 21. The other and free end of the member 27 has a closure head or web to which is secured a tubular piston stem 28, that has sliding movement in central tubular hub 24, of the attaching head 21, with the other end of said piston stem 28 carrying the hereinafter described transversely adjustable block 29 by which the longitudinal movement of said piston stem is transmitted to the movable valve heads 14 by the intermediate means hereinafter described.

In the above described construction the thermostatic member 27 has central relation within the enveloping shell 26 with the intermediate space between the two adapted to receive, through the filling orifice and screw plug 25, a filling of expansible liquid, such as sulphuric ether, to act as the expansion medium of the thermostatic member or unit.

The provision of the aforesaid enclosing casing or shell 26, as an element of the thermostatic controlling means of this improvement, is a material part of the same, in that it functions to shield the associated thermo-expansion unit 27 from all disturbing influences due to varying water pressure in the outlet chamber of the valve structure. Resulting therefrom a sensitive and accurate automatic operation of the controlling means is attained, without any practical difficulty arising from the interposition of said casing or shell 26 as a partition between the outflowing water and the thermo-expansion unit 27, as disclosed in practical test of the appliance.

Another material feature in this invention consists in forming the passage of the tubular member 12 with a downward slope from its respective ends to its mid-width, with the formation of the slit or orifice 12′ at such mid-width. Said slot or orifice 12′ is preferably of a narrow form extending the full transverse extent of the member, so as to discharge the attempered water in a thin sheet in a downward direction upon the crown of the enveloping shell 26, of the thermostatic member of the valve structure. With such sloping formation of the passage of the tubular member 12, any water passing the valve heads 14, is drained by gravity out of said passage, with a view to avoid freezing during non-use in cold weather.

The operative connections heretofore referred to, between the rocking bar or lever 16 of the valve heads 14, and the piston stem 28 of the thermostatic member 27, comprises a detail construction and arrangement of parts as follows:—

The heretofore referred to semi-rotary head 30, is operatively connected by a vertical end rib or spline 31, with a complementary vertical slot 32 in a loose or floating member 33 of a plate form, and with such member formed in turn with a pair of longitudinally elongated slots 34 for operative engagement with studs 35 projecting at the side of an adjacent rail member of the rocking lever 16, aforesaid. In the construction shown the said studs 35 are each formed on an end of a cross rod passing through the pair of rail members, with a view to provide a rigid connection between said rails. The connection above described constitutes what is known in the trade as the "Oldham coupling" and affords operative connection between the semi-rotary head 30 and rocking lever 16, while permitting the heretofore described independent vertical adjustment of the rocking lever 16 and associated parts in relation to said semi-rotary head 30.

Semi-rotary movement of the aforesaid head 30 is attained through a vibratory vertical rod or bar 36 the upper end of which has fixed attachment to a cylindrical plug 37 that has movement in an obliquely formed orifice in the head 30, the construction being such that with a turning movement of the obliquely arranged plug 37, by a vibratory movement of the rod or bar 36 in a straight path, a semi-rotary movement is imparted to the head 30, and through the same, a complementary movement of the rocking lever 16 and pair of valve heads 14. The plug 37 is held in place by the movement of an adjacent portion of the rod or bar 36 in a slot 38 formed in the body of the head 30 in right angle relation to the oblique orifice of the same.

At its lower end the vibratory rod 36 is formed with a spherical enlargement 39 having operative engagement in a bearing recess formed in the cross-head 29 for such purpose.

A material part of the invention in connection with the intermediate mechanism just described, involves an adjustable arrangement of the cross-head 29 in a transversely adjustable manner in an end portion of the tubular piston stem 28, of the thermostatic member, whereby an adjustment may be had to vary the degree of temperature of the attempered outflow of water from the valve without disturbance of the normal operation and movement of said thermostatic member, and to such end a construction and arrangement of parts is provided, as follows:—

In the before mentioned orifice in the supplementary portion or section 3 of the valve housing, and in aligned relation to the aforesaid piston stem 28, a semi-rotary stem 40 is mounted, with its range of turning movement limited by a stop pin and elongated slot formation 41 of the parts. At its outer end the stem 40 is provided with an operating handle 42 having movement in relation to a suitable index or scale on the front portion or section 3 of the valve housing, and as usual in the present type of mixing valves.

At its inner end the semi-rotary stem 40 carries an eccentrically arranged pin 43 adapted for operative engagement in a slot 44 in the underside of the cross-head 29, to impart a sliding adjustment to said cross-head in a direction transverse to the axis of the piston stem 28, and through the connections heretofore described, attain the required change in the relative opening and closing movements of the controlling valve heads 14, of the hot and cold water supplies.

Having thus fully described my invention what I claim and desire to secure by Letters Patent, is:—

1. The combination in a mixing valve of a housing provided with a pair of individual inlets in spaced relation and with an outlet passage, individual movable valve members controlling said inlets, a rocking lever having operative connections at its respective ends with said valve members, a vertically adjustable head providing central pivotal support for said lever, manual means for effecting vertical adjustment of said head, a thermostatic controlling means arranged in the outlet chamber of the valve, the same comprising an inner thermo-expansion unit of the bellows type and an outer enclosing casing separating said inner unit from varying pressure influences in the outlet chamber of the valve, and operative connections between said inner unit and the aforesaid rocking lever.

2. The combination in a mixing valve of a housing provided with a pair of individual inlets in spaced relation and with an outlet passage, individual movable valve members controlling said inlets, a rocking lever having operative connections at its respective ends with said valve members, a vertically adjustable head providing central pivotal support for said lever, manual means for effecting vertical adjustment of said head, the same comprising a handled stem journalled in the housing and having at its inner end a screw threaded shank engaging in a screw threaded orifice in said head, a thermostatic controlling means arranged in the outlet chamber of the valve, the same comprising an inner thermo-expansion unit of the bellows type and an outer enclosing casing separating said inner unit from varying pressure influences in the outlet chamber of the valve, and operative connections between said inner unit and the aforesaid rocking lever.

3. The combination in a mixing valve of a housing provided with a pair of individual inlets in spaced relation and with an outlet passage, individual movable valve members controlling said inlets, a rocking lever having operative connections at its respective ends with said valve members, a thermostatic member arranged within the housing adjacent to the outlet passage, a rod receiving a vibratory movement from a piston stem connected to the movable end of the thermostatic member, a semi-rotary head having operative connection with aforesaid rocking lever, a round plug having fixed attachment to aforesaid vibratory rod and having bearing in an oblique journal orifice formed therefor in the semi-rotary head.

4. The combination in a mixing valve of a housing provided with a pair of individual inlets in spaced relation and with an outlet passage, individual movable valve members controlling said inlets, a rocking lever having operative connections at its respective ends with said valve members, a thermostatic member arranged within the valve housing adjacent to the outlet passage thereof, a piston stem attached to the movable end of said thermostatic member, an intermediate rod between said piston stem and operating means of the rocking lever, a transversely adjustable cross head forming the connection between said rod and stem, and manual means for imparting adjustment to said cross head.

5. The combination in a mixing valve of a housing provided with a pair of individual inlets in spaced relation and with an outlet passage, individual movable valve members controlling said inlets, a rocking lever having operative connections at its respective ends with said valve members, a thermostatic member arranged within the housing adjacent to the outlet passage thereof, a piston stem attached to the movable end of said thermostatic member, an intermediate rod between said piston stem and operating means of the rocking lever, a transversely adjustable cross head forming the connection between said rod and stem, and manual means for imparting adjustment to said cross head, the same comprising a manually operated rocking stem journalled in the housing and having an eccentrically arranged pin in operative engagement with said cross head.

6. The combination in a mixing valve of a housing provided with a pair of individual inlets in spaced relation and with an outlet passage, individual movable valve members controlling said inlets, a rocking lever having operative connections at its respective ends with said valve members, a vertically adjustable head providing central pivotal support for said lever, a thermostatic member arranged within the housing adjacent to said outlet passage and having operative connection with the aforesaid rocking lever independent of the manual means for adjusting said lever, a universal coupling constituting a part of the operative connection between the rocking lever and the thermostatic member.

7. The combination in a mixing valve of a housing provided with a pair of individual inlets in spaced relation and with an outlet passage, individual movable valve members controlling said inlets, a rocking lever having operative connections at its respective ends with said valve members, a vertically adjustable head providing central pivotal support for said lever, a thermostatic member arranged within the housing adjacent to said outlet passage and having operative connection with said rocking lever by a universal coupling, the same comprising a semi-rotary head operatively connected to the thermostatic member, a loose coupling plate arranged intermediate of an end of the semi-rotary head and the aforesaid rocking lever and operatively connected to the semi-rotary head by a vertical spline and elongated slot and to said rocking lever by horizontally arranged studs and elongated slots.

8. The combination in a mixing valve of a housing provided with a pair of individual inlets in spaced relation and with an outlet passage, individual movable valve members controlling said inlets, a rocking lever having operative connections at its respective ends with said valve members, a vertically adjustable head providing central pivotal support for said lever, a thermostatic member arranged within the housing adjacent to said outlet passage and having operative connections with said rocking lever by a universal coupling, the same comprising a semi-rotary head having operative connection with the thermostatic member through a vibratory rod, a round plug fixedly attached to said rod and having bearing in an obliquely formed orifice in the semi-rotary head, a floating coupling plate arranged intermediate of the semi-rotary head and the aforesaid rocking lever and operatively connected to the semi-rotary head by a vertical spline and elongated slot and to said rocking lever by horizontally arranged lugs and elongated slots.

9. The combination in a mixing valve of a housing provided with a pair of individual inlets in spaced relation and with an outlet passage, individual movable valve members controlling said inlets, a rocking lever having operative connections at its respective ends with said valve members, a tubular connecting member arranged intermediate of the pair of independent inlets and enclosing the movable valve members, the central portion of said tubular member having a downward discharge orifice, a thermostatic member arranged in the interior of the valve housing immediately beneath said discharge orifice, and operative connections between said thermostatic member and the aforesaid rocking lever.

10. The combination in a mixing valve of a housing provided with a pair of individual inlets in spaced relation and with an outlet passage, individual movable valve members controlling said inlets, a rocking lever having operative connections at its respective ends with said valve members, a tubular connecting member arranged intermediate of the pair of independent inlets and enclosing the movable valve members, the passage of said tubular member sloping towards the middle and formed at such point with a downwardly discharge orifice, a thermostatic member arranged in the interior of the valve housing immediately beneath said discharge orifice, and operative connections between said thermostatic member and the aforesaid rocking lever.

11. The combination in a mixing valve, of a housing formed of shell shaped upper and lower sections and supplementary front section, the lower section having a pair of independent inlets in spaced relation near its upper end and an outlet passage at its lower end, individual movable valve members controlling said inlets, a rocking lever having operative connections at its respective ends with the said valve members, a thermostatic controlling means arranged in the outlet chamber of the valve, the same comprising an inner thermo-expansion unit of the bellows type and an outer enclosing casing separating said inner unit from varying pressure influences in the outlet chamber of the valve, and operative means between said inner unit and the rocking lever aforesaid, the thermostatic controlling means having a carrying head mounted in an orifice in a wall of the outlet chamber of the valve.

12. The combination in a mixing valve, of a housing formed of shell shaped upper and lower sections and a supplementary front section, the lower section having a pair of independent inlets in spaced relation near its upper end and an outlet passage at its lower end, individual movable valve members controlling said inlets, a rocking lever having operative connections at its respective ends with said valve members, a thermostatic member arranged within said lower section adjacent to the outlet passage and having operative connection with the aforesaid rocking lever, a tubular connecting member arranged intermediate of the pair of independent inlets and enclosing the movable valve members, the central portion of said tubular member having a downward discharge orifice, said thermostatic member comprising a carrying head mounted in an orifice in the front wall of the lower housing section, an expansion shell arranged within said outer shell and attached at one end to said carrying head with its free end carrying a piston stem constituting a part of the aforesaid operative connections between the thermostatic member and the aforesaid rocking lever.

13. The combination in a mixing valve, of a housing formed of shell shaped upper and lower sections and a supplementary front section, the lower section having a pair of independent inlets in spaced relation near its upper end and an outlet passage at its lower end, individual movable valve members controlling said inlets, a rocking lever having operative connections at its respective ends with said valve members, a thermostatic member arranged within said lower section adjacent to the outlet passage and having operative connection with the aforesaid rocking lever, a tubular connecting member arranged intermediate of the pair of independent inlets and enclosing the movable valve members, the passage of said tubular member sloping towards the middle and formed at such point with a downwardly discharge orifice, said thermostatic member comprising a carrying head mounted in an orifice in the front wall of the lower housing section, an outer shell attached at one end to said carrying head, an expansion shell arranged within said outer shell and attached at one end to said carrying head with its free end carrying a piston stem constituting a part of the aforesaid operative connections between the thermostatic member and the aforesaid rocking lever.

14. The combination in a mixing valve, of a housing formed of shell shaped upper and lower sections and a supplementary front section, the lower section having a pair of independent inlets in spaced relation near its upper end and an outlet passage at its lower end, individual movable valve members controlling said inlets, a rocking lever having operative connection at its respective ends with such valve members, a thermostatic controlling means arranged in the outlet chamber of the valve, the same comprising an inner thermo-expansion unit of the bellows type and an outer enclosing casing separating said inner unit from varying pressure influences in the outer chamber of the valve, operative means between said inner unit and the rocking lever aforesaid, the thermostatic controlling means having a carrying head mounted in an orifice in a wall of the outlet chamber of the valve, and an operating means between the inner unit of the controlling means and the rocking lever aforesaid, comprising a piston stem attached to the movable end of said inner unit, an adjustable cross-head on said piston stem, means for manually adjusting said cross head, and operative connections between said cross head and said rocking lever.

Signed at Chicago, Illinois, this 21st day of May, 1927.

HARRY A. BERN.